United States Patent [19]

Canestri

[11] Patent Number: 4,937,014

[45] Date of Patent: Jun. 26, 1990

[54] METAL CONTAINING POLYMERIC DISPERSING AGENT

[75] Inventor: Giuseppe Canestri, Via Parisano, Italy

[73] Assignee: Bergvik Kemi AB, Soderhamn, Sweden

[21] Appl. No.: 871,388

[22] Filed: Jun. 6, 1986

[30] Foreign Application Priority Data

Jun. 11, 1985 [JP] Japan ................................ 60-125279

[51] Int. Cl.⁵ ....................... B01F 17/30; B01F 17/28; B01F 17/16
[52] U.S. Cl. .................................... 252/356; 252/357; 106/505
[58] Field of Search ........................... 106/308 N, 505; 252/356, 357

[56] References Cited

FOREIGN PATENT DOCUMENTS 2040560 4/1971 Fed. Rep. of Germany ....... 252/356
0221387 12/1984 Japan .................................... 252/356
8102395 9/1981 PCT Int'l Appl. .

Primary Examiner—John S. Maples
Attorney, Agent, or Firm—Waldron & Associates

[57] ABSTRACT

A dispersing agent of the formula

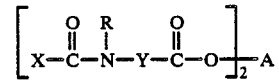

wherein

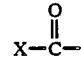

is the residue of a polyester chain having a molecular weight of at least 1000;

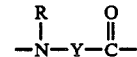

is the residue of an aliphatic or aromatic amino acid; and

—O—A—O— is the residue of a metal salt $Me(OH)_2$, $Me(OCOR_1)_2$ or $Me(OH)_2$—$OCOR_1$, wherein $R_1.COO$— is the residue of a carboxylic acid, optionally in combination with an aliphatic diamine $NHR_2$—T—$NH_2$, wherein $R_2$ is hydrogen or $C_{1-20}$ alkyl, and a salt of said diamine and a residual carboxylic acid deriving from the polyester mixture. The dispersing agents are useful for dispersing pigments and dyes in organic liquids.

7 Claims, No Drawings

METAL CONTAINING POLYMERIC DISPERSING AGENT

The present invention relates to a metal containing polymeric dispersing agent, which is useful for dispersing solid particles, such as pigments and dyes, in organic liquids. The dispersing agent of the invention comprises an amino acid, which has first been reacted with a metal salt and then with a carboxylic acid terminated polyester forming an amide bond with the amino group of the amino acid.

From WO No. 81/02395 polymeric dispersing agents for dispersing solid particles in an organic liquid are known, consisting of an oligo or polyamide chain connected with at least one polyester chain. The known dispersing agents can however not be used for several purposes. As being not sufficiently polar, they can not for instance be used to prepare an easily dispersable pigment from a water slurry of the pigment.

The ogject of the invention is to provide a dispersing agent of greater universal application, which can better maintain the characteristics of the dispersion and the protection of the pigment surface in aromatic solvents without losing at the same time the good properties required for use in lithographic printing inks. Another object is to provide a dispersing agent from which a water emulsion could be prepared, which can be used to disperse solid particles and especially pigments precipitated in non polar and sometimes also in polar solvents. These dispersing agents can be employed during the precipitation of pigments, the pigments thus being prevented from agglomeration. Still another object of the invention is to provide a dispersing agent giving low viscosity dispersions of high solids loadings and having increased storage stability.

The objects of the invention are achieved by means of a dispersing agent of the formula

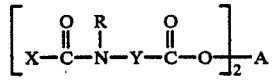

wherein

is the residue of a polyester chain having a molecular weight of at least 1000;

is the residue of an aliphatic or aromatic amino acid; and

—O—A—O— is the residue of a metal salt $Me(OH)_2$, $Me(OCOR_1)_2$ or $Me(OH)_2$—$OCOR_1$, wherein $R_1 \cdot COO$— is the residue of a carboxylic acid.

It has been found that the addition of small amounts of an aliphatic diamine increases the efficiency of the dispersants of the invention. It is believed that this increased efficiency is due to an increased coordinating ability to the pigments. In this case the dispersing agent of the invention has the composition

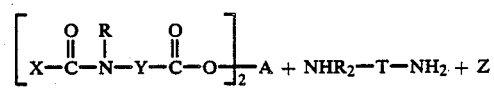

wherein

is the residue of a polyester chain having a molecular weight of at least 1000;

is the residue of an aliphatic or aromatic amino acid; and

—O—A—O— is the residue of a metal salt $Me(OH)_2$, $Me(OCOR_1)_2$ or $Me(OH)_2$—$OCOR_1$, wherein $R_1 \cdot COO$— is the residue of a carboxylic acid;

$NHR_2$—T—$NH_2$ is an aliphatic diamine, wherein $R_2$ is hydrogen or $C_{1-20}$ alkyl; and Z is a salt of said diamine and a carboxylic acid.

T is preferably a $C_{2-12}$ alkylene or alkenylene group the chain of which may optionally include one or more oxygen or nitrogen atoms.

The polyester chain in the dispersing agent is preferably derived from a saturated or unsaturated aliphatic $C_{16-22}$ hydroxycarboxylic acid or from a mixture of such hydroxycarboxylic acids and the corresponding carboxylic acids which do not contain a hydroxy group.

A useful dispersing agent comprises residues of a polyester chain X—COOH of the formula

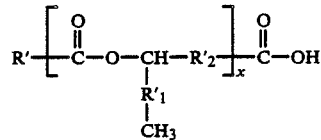

wherein R' is a saturated or unsaturated aliphatic $C_{17}$ radical, $R'_1$ is alkylene or alkenylene containing 4–9 carbon atoms, $R'_2$ is alkylene or alkenylene containing 11–6 carbon atoms, and x is 4–40.

As examples of hydroxycarboxylic acids which can be used in preparing said polyester chains can be mentioned 11-, 12- and 13- hydroxystearic acids, ricinoleic acid, but also compounds of the formulas $CH_3 \cdot (CH_2)_5 \cdot CH(OH)CH_2 \cdot CH=CH \cdot (CH_2)_7 \cdot COOH$
$CH_3 \cdot (CH_2)_9 \cdot CH(OH) \cdot CH=CH \cdot (CH_2)_4 \cdot COOH$
$HO \cdot (CH_2)_{17}$—COOH; $(HO) \cdot CH$—$(CH_2)_{14}$—COOH
and
$(HO) \cdot CH(CH_2)_{20}$—COOH Commercial hydroxy acids normally also contain the corresponding carboxylic acid in an amount of 3–20% by weight and are useful starting materials in preparing the polyesters for the dispersants of the invention. As an example of a commercial product can be mentioned hydrogenated castor oil fatty acid mainly consisting of 12-hydroxystearic acid. Mixtures of different hydroxy carboxylic acids can also be used, such as can be derived from tall oil and tallow fatty acids.

The aliphatic or aromatic amino acid of the formula NHR—Y—COOH, to the amino group of which the polyester is linked, is preferably an amino acid wherein Y is $C_{1-12}$ alkylene optionally having one or more amino, phenyl and/or carboxyl substituent and optionally comprising a disulfide bridge or a —NH—CO—phenylene bridge, and R is hydrogen or $C_{1-20}$ alkyl or alkoxy.

As examples of amino acids which can be used in preparing the dispersing agents of the invention can be mentioned $NH_2\cdot(CH_2)_5\cdot COOH$, $NH_2\cdot(CH_2)_3\cdot CH(NH_2)COOH$, $NH_2\cdot(CH_2)_8\cdot COOH$, $NH_2\cdot CH_2\cdot CH(NH_2)COOH$, $NH_2\cdot(CH_2)_3\cdot COOH$, $NH_2\cdot(CH_2)_4\cdot COOH$, $NH_2\cdot(CH_2)_{11}\cdot COOH$, $NH_2\cdot(CH_2)_{10}\cdot COOH$, and cystine

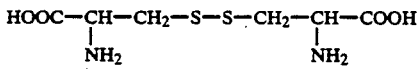

Another useful amino acid can be obtained by reacting a phthalic anhydride and a diamine. It might be of advantage that the amino group of the amino acid is protected by means of a conventional amino protecting group, for instance an alkoxy group, as acetoxy or propoxy.

The metal salt which is reacted with the amino acid is a hydroxide or a carboxylate of a divalent or trivalent metal. A suitable trivalent metal is Al and a preferable salt thereof is a salt of a saturated or unsaturated $C_{16-22}$ carboxylic acid, such as palmitic, stearic, linoleic and arachidonic acid. Suitable divalent metals are Ca, Cu, Ni, Pb, Co and Mg, and preferably; salts thereof. In addition to the hydroxides, salts of a saturated $C_{1-3}$ carboxylic acid, such as acetic and propionic acid are also effective.

In the diamine $NHR_2$—T—$NH_2$, which forms a disalt with unreacted carboxylic acid groups, T is preferably a $C_{2-12}$ alkylene or alkenylene, the chain of which could optionally comprise one or more oxygen or nitrogen atoms. Said O and N substituted diamines behave in the same way as the unsubstituted diamines, having the same coordinating ability to pigments. Useful primary diamines are for instance propylene diamine, butylene diamine, hexylene diamine, decylene diamine, 4,7-dioxiadecane-1,10-diamine and trioxatridecane-1,13-diamine, polyoxypropylene diamine. As an example of a secondary amine can be mentioned tallow alkyl propylene diamine.

The dispersing agent of the invention can be prepared in two steps. First an amino acid, NHR—Y—COOH, is reacted with a metal salt $Me(OH)_2$, $Me(OCOR_1)_2$ or $Me(OH)_2$—$OCOR_1$ and then the reaction product obtained is reacted with a carboxylic acid terminated polyester having a molecular weight of at least 1000.

The metal carboxylates can be produced from the corresponding hydroxides or acetates. It is often advantageous to protect the amino group of the amino acid. This can be done in various ways, for instance an acetamide formation with acetic anhydride.

By means of a dispersing agent of the invention a dispersion of solid particles in an organic liquid can be prepared by well known methods for the preparation of dispersions.

Thus the solid particles, e.g. pigment particles, the organic liquid and the dispersing agent according to the invention, can be mixed in any sequence and the mixture can then be subjected to a mechanical treatment to break down agglomerates, if any, of solid particles, e.g. by ball-milling, roller-milling or flushing. The solid substance can also be milled alone with the dispersant or in admixture with the organic liquid and the remaining component be added, whereafter the dispersion is formed by stirring of the mixture.

The amount of dispersing agent in a dispersion is preferably from 1 to 20% by weight and more preferably from 5 to 15% by weight based on the weight of the solid particles. The dispersion preferably contains from 40 to 60% by weight of solid organic particles, and from 50 to 80% by weight of solid inorganic particles, based on the total weight of the dispersion.

For some applications very inexpensive dispersants are required. It is then advantageous to mix the dispersants according to this invention with dimerised or oligomerised rosin acids. The rosin acid products should have suitable adhesion, molecular weight and solubility properties for this purpose. One of these products is Bevitack 140 from Bergvik Kemi, Sweden.

The organic liquids used for the preparation of said dispersions may be inert organic liquids in which the dispersing agent is at least partially soluble at room temperature and which are stable under the conditions at which the dispersions are to be used. If required, mixtures of organic liquids may be used. Preferred organic liquids are hydrocarbons and halogenated hydrocarbons, such as toluene, xylene, white spirit, chlorobenzene, carbontetrachloride and perchloroethylene. Also other organic liquids can be used, for example esters, such as butyl acetate, alcohols, such as n-butanol, and vegetable oils. It is particularly preferred to use petroleum fractions. In general the selection of the organic liquids or mixture thereof used for the preparation of the dispersions depends on the use of the product to which the dispersions are to be added.

As mentioned above the solid particles preferably are pigment particles. In case of inorganic pigments, these are preferably the ones which contain metal atoms, and as examples of such pigments can be mentioned titanium dioxide, prussion blue, cadmium sulphite, iron oxides, vermillion, ultramarine and chrome pigments, including chromates of lead, zinc, barium and calcium and mixtures and modifications thereof. These pigments are commercially avialable as greenish-yellow to red pigments under the names primrose, lemon, middle, orange, scarlet and red chromes. The organic pigments are preferably water-insoluble metal salts or complexes, particularly calcium or barium salts or complexes of soluble or sparingly soluble organic dyes, especially azodyes and phthalocyanines.

Other examples of suitable pigments are described in the third edition of Colour Index (C. I.), 1975, published by the American Association of Textile Chemists and Colourists and the Society of Dyers and Colourists.

The dispersions obtained with the dispersing agents according to the invention are fluid or semi-fluid compositions containing the solid in finely divided and usually deflocculated form, and they can be used for any purpose for which the dispersions of such solids are conventionally used. Dispersions of pigments are of particular use in the manufacture of printing inks by admixing the dispersions with other components conventionally used in the manufacture of such inks. The dispersions are also of value in the manufacture of paints in which they may be admixed with e.g. conventional alkyl and/or other resins.

One of the advantages of the invention is that finished inks can be produced without grinding in pearl mills, bead mills or three roll mills. This is achieved with the dispersants according to the invention and the effect of dilatancy. A collodial dispersion or a suspension becomes dilatant when the force of flocculation is quite samll or absent and the amount of liquid phase is just sufficient to fill the spaces between the particles when these are in the position of minimum or nearly minimum voids. Any attempts to force such a material to flow rapidly disturbs the position of the particles, resulting in a dilatation of the voids. Since there is not enough liquid present to fill the expanded voids, the material as a whole, becomes harder almost proportionally to the applied force in the beginning but clearly dilatant as the applied force increases. This effect becomes evident when amperometric readings and speed increases of the kneader mixer are related. Changing dilatant viscosity to newtonian viscosity by adding a highly viscous medium of newtonian or pseudoplastic consistency it is possible to maintain deflocculated particles, even when later the viscosity is reduced, observing the condition that the mixture must never be plastic. Electron micrographs of the dispersions show a perfect dispersion of the pigment particles.

The dispersing agent of the invention can be used for dispersing dry pigments or pigments in the form of a press cake in an organic liquid. It can also be used for preparing easily dispersable pigments from water slurries and in flushing operations for the production of concentrated pastes. The dispersing agent can also be used for chipping with resins or thermoplastic materials.

Easily dispersible pigments can be prepared by adding the dispersant as an aqueous emulsion or alone, to a slurry containing the components of the pigment before coupling, to a coupled pigment before lacking, to a coupled pigment before boiling or to a coupled pigment before washing and drying.

The dispersants can be added as an aqueous emulsion to pigment slurries in order to be precipitated on the surface of the pigments, which will achieve better dispersibility. The addition of aqueous emulsion of the dispersants to a water slurry can be made with two different methods:

1. Diluting the dispersant 75/25 with a misture of $C_{10}$-$C_{13}$ alcohols and ethylene glycol copolymers and then adding 2 times the water content, corresponding to the above mentioned mixture, heated at 75° C., to the pigment slurry;

2. Dissolving the dispersant 50/50 in an alkyl amine and then diluting with the same amount of the mixture with glacial acetic acid, then diluting the total mixture 2 times with water, under stirring at a temperature around 70°-80° C., and then introducing such mixture to the pigment slurry.

The invention will be described in further details by the following examples.

EXAMPLE 1

70 kg of 12-hydroxystearic acid, having a COOH eq.w. of 320 and an OH eq.w. of 362, are reacted, while stirring, in a 100 liters polymer reactor under an atmosphere of nitrogen, until 193.4 moles of water is removed with toluene at 200°-210° C. The acid number of the reaction product is then 22 mg KOH/g, corresponding to a COOH eq.w. of the product of 2600. The toluene is removed in vacuum at 180° C. The product thus obtained is a brownish low viscosity liquid being soluble in aromatics and aromatics containing liquids.

In the same way polyesters from the following components have been made: 11-hydroxystearic acid, 13-hydroxystearic acid, ricinocleic acid, and a mixture of 12-hydroxystearic acid and hydrogenated castor oil. The acid numbers for these polyesters vary from 20 to 40 mg KOH/g.

EXAMPLE 2

In a flask equipped for azeotropic reactions 201 g of 11-aminoundecanoic acid and 102 g of acetic anhydride are heated to about 100° C. The temperature is raised slightly until one mole of acetic acid has evaporated. The acetamide so formed shows IR bands at 3,300 $cm^{-1}$ and 1,640 $cm^{-1}$ due to the amide group.

Into the molten acetamide 200 g of copper(II)acetate monohydrate is added and the temperature is kept at 130° C. until two moles of acetic acid and one mole of water has been collected. The compound is now pale green with an acid number of about 5 mg KOH/g. Infrared spectroscopy shows strong bands at 1,550 $cm^{-1}$ and 1,400 $cm^{-1}$ due to the ionised carboxyl group.

To the copper salt is added 6,200 g of polyester made according to Example 1. The components are stirred at 150° C. under reduced pressure (10 mm Hg) until two moles of acetic acid are collected. The compound is now pale green, homogeneous with an acid number of 20-25 and showing the IR bands mentioned above for the amide and carboxylate structures.

In the same way dispersants containing calcium, magnesium and lead can be made.

EXAMPLE 3

To a dispersant produced according to Example 2, 620 g of "Duomeen T" (a tallow alkyl propylene diamine from Akzo, NL) is added at 110° C. and the mixture is stirred half an hour. The product obtained is a pale green paste with an acid number of 10-13 mg KOH/g.

EXAMPLE 4

In a 10 liters flask, under nitrogen atmosphere 150 g toluene is introduced together with 317 g Al-hydroxide monopalmitate and 208 g of 2,3-diaminopropionic acid. The temperature is raised to 190° C., while the product is stirred, until 2 moles water is removed.

At 190° C., 5190 g of the polyester from 12-hydroxystearic acid is introduced. The temperature is raised and maintained at 200° C. until 2 moles of water is removed. The toluene is removed in vacuum at 180° C.

EXAMPLE 5

In a 10 liters flask, under nitrogen atmosphere, 150 g toluene are introduced with 93 g Ni(OH)$_2$ and 72 g of saturated NH$_4$OH, stirring for a period of 30 minutes at room temperature. Then 235 g of 5-aminovaleric acid are added. The temperature is raised to 190° C. while the product is stirred until 2 moles water and the ammonia solution is removed.

At 190° C., 5190 g of the polyester from 12-hydroxystearic acid is introduced. The temperature is raised and maintained at 200° C. until 2 moles of water are removed. The toluene is removed in vacuum at 180° C.

EXAMPLE 6

In a 10 liters flask, under nitrogen atmosphere 150 g "Solvess® 100" (an aromatic hydrocarbon solvent from Esso Chemicals, U.S.) is introduced together with 75 g calcium hydroxide and 403 g 11-aminoundecanoic acid. The temperature is raised to 190° C. The product is stirred, until 2 moles water is removed.

At 190° C., 5190 g of the polyester from 12-hydroxystearic acid is introduced together with 200 g of toluene. The temperature is raised and maintained at 200° C. until 2 moles of water is removed. The toluene and "Solvess 100" are removed in vacuum at 180° C.

EXAMPLE 7

In a 10 liters flask, under nitrogen atmosphere 150 g toluene is introduced together with 100 g zinc hydroxide and 72 g $NH_4OH$, stirring at room temperature for a period of 30 minutes. Then 235 g of 5-aminovaleric acid is introduced. The temperature is raised to and maintained at 190° C., while the product is stirred, until 2 moles of water and the ammonia solution are removed.

At 190° C., 5190 g of the polyester from 12-hydroxystearic acid is introduced. The temperature is raised to and maintained at 200° C. until 2 moles of water is removed. The toluene is removed in vacuum at 180° C.

EXAMPLE 8

In a 10 liters flask, under nitrogen atmosphere, 150 g toluene is introduced together with 58.40 g of magnesium hydroxide and 346.55 g of 9-aminopelargonic acid. The temperature is raised to and maintained at 190° C., while the product is stirred, until 2 moles of water is removed. The IR spectrum shows bands at 1560 and 1400 $cm^{-1}$ due to the carboxylate structure.

At 190° C., 5190 g of the polyester from 12-hydroxystearic acid is introduced. The temperature is raised to and maintained at 200° C. until 2 moles of water is removed. The toluene is removed in vacuum at 180° C.

The products obtained in Examples 2 to 8 are brownish, with a consistency varying from viscous to waxy solid and an acid number of 0–1 mg KOH/g; they are soluble or partially soluble in aromatics, aromatics-containing liquids and aliphatic hydrocarbons. IR analyses show a broad, strong absorption at 1550–1610 $cm^{-1}$ due to antisymmetrical vibrations in the $COO^-$ structure.

EXAMPLE 9

In a 10 liters glass flask, under nitrogen atmosphere, a mixture of 200 g $CH_3OH$, 75 g calcium hydroxide and 480 g cystine is heated while stirring at 130° C. and while adding from a closed glass funnel, 200 g of toluene.

After having removed 200 g of $CH_3OH$, the temperature is raised to 210° C. and maintained until 2 eq. of water is separated. Then 232 g of hexamethylene diamine is introduced and heated at 180° C., and then 4800 g of the polyester from 12-hydroxystearic acid is added and the mixture is heated while stirring at 210°–220° C. until 2 eq. of water is separated. The toluene is then removed by distillation under vacuum at 220° C. The temperature is lowered to 130° C. At 130° C., 95 g of "Duomeen T" is introduced, then the temperature is lowered to 110° C. and maintained for one hour. Dispersants containing copper and magnesium can be prepared in an analogous way.

EXAMPLE 10

In a 10 liters glass flask, under nitrogen atmosphere, a mixture of 200 g toluene, 75 g calcium hydroxide and 403 g 11-aminoundecanoic acid is heated while stirring at 190°–200° C. 774 g of the polyester from 12-hydroxystearic acid is added and the mixture is heated while stirring at 200°–210° C. until another 2 eq. water is separated.

The toluene is then removed by distillation under vacuum at 200° C. The temperature is lowered to 130° C. At 130° C., 100 g of "Duomeen T" is introduced and then the temperature is lowered to 110° C. and maintained for one hour.

EXAMPLE 11

To 200 g of xylene, 720 g of "Duomeen T" is added. The mixture is heated to 100° C. Phthalic anhydride (396 g) is added in small lots. The temperature is kept at 110° C. for one hour and then lowered to 850° C. Calcium hydroxide, 75 g, is added and the temperature held at 85°–90° C. for one hour. The mixture is then refluxed until 2 moles of water has been evaporated and collected.

22 moles of 12-hydroxystearic acid is added. The temperature is raised to 220° C. and kept there until 22 moles of water has evaporated. The temperature is now lowered to 130° C. and 1300 g "Duomeen T" is added. Residual xylene is removed in vacuum. The product is a pale brown liquid with an acid number of 25 mg KOH/g. IR shows absorptions at 1518 and 1400 $cm^{-1}$ due to the carboxylate structure.

EXAMPLE 12

The procedure of Example 11 is followed until 22 moles of water has evaporated. Then, at 150° C., 3000 g of "Bevitack 140" (a dimerised rosin from Bergvik Kemi AB, SE) is added while stirring. The temperature is then lowered to 130° C. and 1300 g "Duomeen T" is added. Residual xylene is removed in vacuum. The product is a brown liquid with an acid number of 45 mg KOH/g. IR shows the carboxylate bands mentioned in Example 11 to be intact.

In order to compare the properties of a pigment paste with and without a dispersant of the invention, a pigment paste is made from "Heliogen Blau D 7030" (from BASF, DE), 18%, a standard vehicle and the dispersant according to this example (8% by weight on the pigment). Rheological measurements are made on a Rotovisco cone and plate viscometer. Flow values were measured on a standard flowmeter.

|  | Yield value Pa | Viscosity Pa.s | Tixotropy Pa/s | Flow after 60 min cm |
|---|---|---|---|---|
| Without dispersant | 155 | 3.2 | 392 | 1 |
| with dispersant of the invention | 79 | 8.7 | 1200 | 4 |

EXAMPLE 13

12 parts of the product prepared in Example 2 are mixed with 5 parts of monosulponated Cu phthalocyanine blue and 2 parts of "Duomeen T" and after 30 minutes mixing in a high speed mixer, are milled on a 3 roller mill, until the particles of the dispersion are reduced to 5 microns.

15 parts of the product so prepared dissolved in 27 parts of "PKWF 210 230" (a mineral oil from Haltermann, DE) and 58 parts of Pigment Blue 15.3 (C. I. 74160), "Chromofine Blue 4927" (from Dainichiseika, JP), are mixed with a slowly moving stirrer. After 30 minutes of predispersing, the dispersion is milled once on a 3 roller mill.

The dispersion thus obtained is fluid and contains blue pigment particles in finely divided and deflocculated state, and is excellently suitable for use in e.g. paints, lacquers and printing inks, including lithographic printing inks.

In some cases the time it takes for the dispersant to attach itself to the pigment is too long for practical purposes. This process may be facilitated by mixing the dispersant with a pigment similar to that being dispersed but having a higher electronic charge.

EXAMPLE 14

An aqueous slurry of Pigment Blue 15.3 (C.I. 74160) containing 6000 parts of water at 50° C. and 100 parts of salt-ground betacopper phthalocyanine blue (PC beta blue) is prepared from phthalo nitrile, urea and copper-(II)chloride.

Under good stirring are added 8 parts of copper phthalocyanine sulphonic acid, $CuPc(SO_3H)$, as an aqueous slurry. The pH is adjusted to 5.0 by addition of dilute hydrochloric acid or sodium hydroxide as required. From a separate vessel is blown, over a period of 30 minutes, 6 parts of "Duomeen T" as a solution in 25 parts of glacial acetic acid and 1000 parts of water. From another separate vessel is blown over a period of 30 minutes, 10 parts of the product prepared according to Example 2, as a 20%water/non-ionic surfactant emulsion, having a temperature of 60° C. The slurry is stirred a further 30 minutes, then the temperature is lowered down to 30° C., filtered and washed saltfree with water to neutral pH, prior to drying at 50° C. 116 parts of a treated PC beta blue pigment are obtained and then micronised.

The pigment thus obtained can be milled on a 3 roller mill or through a Netzsch pearl mill, fed by a peristaltic pump, after a predispersion by a high speed mixer, in mineral oil "PKWF 210/230" of toluene. The rheological properties and the tinctorial strength of lithographic and rotogravure printing inks (after completing with the respective vehicles) are better than those provided by the untreated Pigment Blue 15.3.

EXAMPLE 15

In a 12 liters kneader mixer, with a motor of 2.5 h.p. and a mechanical speed regulator giving a speed variation from 30 r.p.m. to 150 r.p.m., made in such way that the 2 Z intersectant blades are rotating on the part of the mixer corresponding to 2.5 liters of the total volume, are introduced: 1700 g of Pigment Red 57 (C.I. 15850) "Isol Bona Rubine 4 BK" (from Kemisk Verk Köge, DK), 292 g of the dispersant produced according to Example 10, 664 g of "P.K.W.F. 260/290" (mineral oil from Haltermann, DE). The mixture is stirred at 30 r.p.m. for 10 minutes and for 110 minutes at 60 r.p.m. Then are added 265 g of a varnish (made by 60 parts "Hydrocarbon Resin A 120" (aliphatic hydrocarbon resin from Hercules, NL) in mineral oil) from the top of the mixer, by a peristaltic pump, increasing the speed to 90 r.p.m. After 1 hour are added 6000 g of a varnish (having a viscosity of 2200 poise and made of "Alsynol RL 25 N" (rosin modified phenolic resin from Synres, NL)/linseed oil/"Shell Ink Solvent 27/29" (mineral oil from Shell, NL): 49.2/19.8/31/parts by volume. The mixer is stopped and then is introduced 150 g "Fluon L 170" (PTFE wax from ICI, GB). The speed is increased to 120 r.p.m., and 400 g oleic acid is introduced under stirring. Then is introduced, 40 g of 10% Mn octoate diluted in 400 g of the above mentioned mineral oil. The product thus obtained is a perfectly dispersed sheet feed offset ink. The kneader is settled under vacuum (10 mm Hg residual pressure) and the speed is reduced to 30 r.p.m., for 30 minutes.

The colouring power of the ink made with the above mentioned method shows an increase of colouring power of 15% compared to ink, made by 2 times milling on a roller mill, at the same pigment concentration.

EXAMPLE 16

In a 12 liters kneader mixter of the same type as described in Example 15, are introduced: 1670 g of Pigment Blue 15.3 (C.I. 74160) "Turchese Segnale Luce NCG" (from Pigmenti Italia, IT), 584 g of a mixture of the following ingredients: 12 parts by weight of a polyester from 12-hydroxystearic acid prepared according to Example 1, 5 parts by weight of monosulphonated copper phthalocyanine blue and 2 parts by weight of "Duomeen T", 130 g of varnish (made by 68 parts "Hydrocarbon Resin A 120 in mineral oil" "P.K.W.F. 260/290") and 266 g of mineral oil "P.K.W.F. 260/290". The mixture is stirred at 30 r.p.m. for 10 minutes and for 110 minutes at 60 r.p.m. Then are added 340 g of the above mentioned varnish, from the top of the mixer, by a peristaltic pump, increasing the speed at 90 r.p.m. After 1 hour are added 6000 g of another varnish (having a viscosity of 2200 poise and made of "Alsynol RL 25 N"/linseed oil/"Shell Ink Solvent 37/29": 49.2/19.8/31 parts by volume. The mixer is stopped and 150 g "Fluon L 170" is introduced. The speed is increased to 120 r.p.m., and 350 g oleic acid is introduced under stirring. Then is introduced 35 g of 10% Mn octoate diluted in 550 g of "Shell Ink solvent 27/29". The product thus obtained is a perfectly dispersed sheet feed offset ink. The kneader is settled under vacuum (10 mm Hg residual pressure) and the speed is reduced to 30 r.p.m. for 30 minutes.

The colouring power of the ink made with the above mentioned method shows an increase of colouring power of 15% compared to ink, made by 2 times milling on a 3 roller mill, at the same pigment concentration.

EXAMPLE 17

In a 5 liters laboratory kneader of the same type as described in Example 15, heated at 45° C., 1500 g filtercake containing 30% of Pigment Blue 18 (C.I. 42770:1) is introduced. Under stirring at low speed (30 r.p.m.) are added 230 g of dispersant produced according to Example 10, together with 70 g "P.K.W.F. 240/270". After flushing out and discharging 70% of the total water contained in the filtercake from the mixer, another 1500 g filtercake is added. Then is added 300 g of mineral oil "240/270" (Haltermann) under stirring at low speed. When more water has been flushed out and discharged from the mixer, another 1500 g filtercake is added. Then is added 300 g of mineral oil "P.K.W.F. 2240/270". After flushing out and discharging more water from the mixer, the total amount of separated water corresponds to 80-85% of the total amount originally contained in the filtercake.

The mixer is settled under vacuum (10 mm Hg residual pressure) at 60° C., 90 r.p.m., until no more than 2% water content appears in the product by water testing. The product thus obtained is a fluid paste containing 60% red deflocculated finely divided pigment particles, 10% of dispersant and 30% "P.K.W.F. 240/270".

The product, "Alkali Blue paste", is suitable for use in printing inks.

EXAMPLE 18

In a 12 liters kneader mixer of the same type as described in Example 15, are introduced: 1700 g of Pigment black 7 (C.I. 77266) Regal 400 R (from Cabot, U.S.), 450 g of the dispersant produced according to Example 10, 65 g "Duomeen T" and 710 g of "P.K.W.F. 360/290". The mixture is stirred at 30 r.p.m. for 15 minutes and for 110 minutes at 60 r.p.m. Then is added 415 g of a varnish (made from 68 parts of "Hydrocarbon Resin A 120" in mineral oil "P.K.W.F. 260/290"), from the top of the mixer, by a peristaltic pump, increasing the speed at 90 r.p.m. After 1 hour are added 500 g "Alkali Blue paste" (from Example 17), 4800 g of a varnish (having a viscosity of 2200 poise and made of "Alsynol RL 25 N"/linseed oil/"Shell Ink Solvent 27/29": 49.2/19.8/31 parts by volume. The mixer is stopped and 150 g "Fluon L 170" is then introduced. The speed is increased to 120 r.p.m., and 200 g oleic acid is introduced under stirring. Then is introduced 60 g of 10% Mn octoate diluted in 450 g "Shell Ink Solvent 27/29". The product thus obtained is a perfectly dispersed sheet feed offset ink. The kneader is settled under vacuum (10 mm Hg residual pressure) and the speed is reduced to 30 r.p.m., for 30 minutes.

The colouring power of the ink made with the above mentioned method shows an increase of colouring power of 15% compared to an ink, made by 2 times milling on a 3 roller mill, at the same pigment concentration.

EXAMPLE 19

In a 12 liters kneader mixer of the same type as described in Example 15, are introduced: 1600 g of Pigment Yellow 13 (C.I. 21100) "Isol Diaryl Yellow GRF 118" from Kemisk Verk Köge, DK), 335 g of dispersant produced according to Example 10, 130 g of a varnish (made from 68 parts of "Hydrocarbon Resin A 120" in mineral oil "P.K.W.F. 260/290") and 390 g of mineral oil "P.K.W.F. 260/290". The mixer is stirred at 30 r.p.m. for 15 minutes and for 110 minutes at 60 r.p.m. Then is added 563 g of "Hydrocarbn Resin A 120", from the top of the mixer, by a peristaltic pump, increasing the speed at 90 r.p.m. After 1 hour is added 6000 g/of a varnish (having a viscosity of 2200 poise and made from "Alsynol RL 25 N"/linseed oil/"Shell Ink Solvent 27/29": 49.2/19.8/31 parts by volume). The mixer is stopped and 150 g "Fluon L 170" is then introduced. The speed is increased to 120 r.p.m. and 200 g oleic acid is introduced under stirring. Next 60 g of 10% Mn octoate diluted in 700 g "Shell Ink Solvent 27/29" is introduced. The product thus obtained is a perfectly dispersed sheet feed offset ink. The kneader is settled under vacuum (10 mm Hg residual pressure) and the speed is reduced to 30 r.p.m., for 30 minutes.

The colouring power of the ink made with the above mentioned method shows an increase of colouring power of 10% compared to an ink, made by 2 times milling on a 3 roller mill, at the same pigment concentration.

EXAMPLE 20

The same procedure, the same time, and the same constituents which have been used in Example 19 can be used also with Pigment Yellow 12 (C.I. 21090) "Isol Diaryl Yellow G.A. 7573" (from Kemisk Verk Köge, DK).

EXAMPLE 21

In a 30 m³ stirring vat, after diazotisation and coupling procedure used to obtain Pigment Red 57,1 (C.I. 15850:1), after having pressed a press cake, containing 155 kg pure dyestuff, derived from the above mentioned chemical reactions, through a 28 frames filter (120×115,3 cm) at 50° C., the product is dissolved in 16000 liters distilled water at 95° C. The solution should be clear. Add 16 kg of the product prepared according to Example 6 as 20% water emulsion obtained by using a non-ionic surfactant after previous heating at 60° C. Stir until the temperature falls to 70° C. and then add, 19 kg rosin soap at approximately 10% solution.

After stirring 5 minutes, blow over, from a pressure vessel, 60 kg calcium chloride as 10% solution. Stir ½ hour at 70° C. and then, taking ½ hour raise the temperature to 80° C. Maintain 80° C. for ½ hour and press with the aid of a centrifugal pump. After filter pressing through a 42 frames (120.115,3 cm) filter, the press cake is about 22% and is dried in an air circulated stove (Wilma, Haas, Schilde) at about 60° C. Grind and micronise after drying.

The pigment thus obtained can be milled on a 3 roller mill or through a Netzsch pearl mill, by a peristaltic pump, after a predispersion done by a high speed mixer in mineral oil "P.K.W.F. 210/230" or toluene.

The rheological properties and the tinctorial strength of lithographic and rotogravure printing inks are better than those provided by the untreated Pigment Red 57,1.

EXAMPLE 22

In a 5 liters flask are introduced 100 parts of Pigment Red 48,2 "Isol Bona Red 2BCT" (from Kemisk Verk Köge, DK) and 500 parts ethanol. The mixture is boiled to reflux with stirring, for 1 hour, then are introduced 16 parts of the dispersant produced according to Example 6, as solution in 300 parts benzene. The mixture is boiled to reflux for further 10 min, then the solvent is removed by distillation under vacuum and recovered. The pigment composition is 116 parts of reduced-dusting powder, having an average particle size of 1.7-2.2 mm² of surface.

The pigment thus obtained can be mixed, in a Silverson mixer, together with varnish constituents for the production of offset inks and rotogravure inks, without further need of grinding. When ground, the products thus obtained show exeptional flow and 15% higher colouring power in comparison with products made with the above mentioned untreated red pigment.

I claim:

1. A dispersing agent having the composition

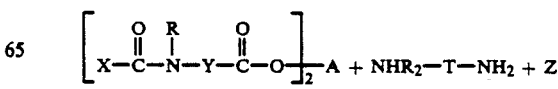

wherein

is the residue of a polyester chain having a molecular weight of at least 1000;

is the residue of an aliphatic or aromatic amino acid; and

—O—A—O is the residue of a metal salt $Me(OH)_2$, $Me(OCOR_1)_2$ or $Me(OH)_2$—$OCOR_1$, wherein $R_1COO$ is the residue of a carboxylic acid;

$NHR_2$—T—$NH_2$ is an aliphatic diamine, wherein $R_2$ is hydrogen or $C_{1-20}$ alkyl; and Z is a salt of said diamine and a carboxylic acid;

Y is a member selected from the group consisting of a $C_{1-12}$ alkylene group, an amino, phenyl or carboxyl substituted $C_{1-12}$ alkylene group, a disulfide bridged $C_{1-12}$ alkylene group, and a amido-phenylene bridged $C_{1-12}$ alkylene group, T is a member selected from the group consisting of a $C_{2-12}$ alkylene group, a $C_{2-12}$ alkenylene group, a $C_{2-12}$ oxygen or nitrogen substituted alkylene group and a $C_{2-12}$ oxygen or nitrogen substituted alkenylene group.

2. A dispersing agent according to claim 1, wherein Z is a salt of a saturated or unsaturated aliphatic $C_{16-22}$ carboxylic acid or a corresponding hydroxycarboxylic acid.

3. A dispersing agent according to claim 1, wherein $R_1COOH$ is a saturated or unsaturated $C_{16-22}$ carboxylic acid and Me is a trivalent metal.

4. A dispersing agent according to claim 1, wherein $R_1COOH$ is a saturated $C_{1-3}$ carboxylic acid and Me is a divalent metal.

5. A dispersing agent according to claim 1, wherein the metal is Al, Ca, Cu, Ni, Pb, Co or Mg.

6. A dispersing agent according to claim 1, wherein the polyester chain is derived from a saturated or unsaturated aliphatic $C_{16-22}$ hydroxycarboxylic acid or from a mixture of such hydroxycarboxylic acids and the corresponding carboxylic acids which do not contain a hydroxy group.

7. A dispersing agent according to claim 6, wherein the polyester chain X-COOH has the formula

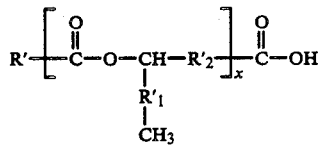

wherein R' is a saturated or unsaturated aliphatic $C_{17}$ radical, $R'_1$ is alkylene or alkenylene containing 4–9 carbon atoms, $R'_2$ is alkylene or alkenylene containing 11–6 carbon atoms, and x is 4–40.

* * * * *